Sept. 4, 1928.

H. T. HERR

SHAFT BEARING

Filed Feb. 10, 1922

1,683,351

WITNESSES:

H. T. Herr
INVENTOR

BY
ATTORNEY

Patented Sept. 4, 1928.

1,683,351

UNITED STATES PATENT OFFICE.

HERBERT T. HERR, OF MERION, PENNSYLVANIA, ASSIGNOR TO WESTINGHOUSE ELECTRIC & MANUFACTURING COMPANY, A CORPORATION OF PENNSYLVANIA.

SHAFT BEARING.

Application filed February 10, 1922. Serial No. 535,527.

My invention relates to bearings, and more particularly to bearings for the shafts of machines which are axially alined and directly connected, and it has for an object the provision of apparatus of the character designated, which shall serve to eliminate one of the bearings, and the flexible coupling usually employed in such machines.

Figure 1:
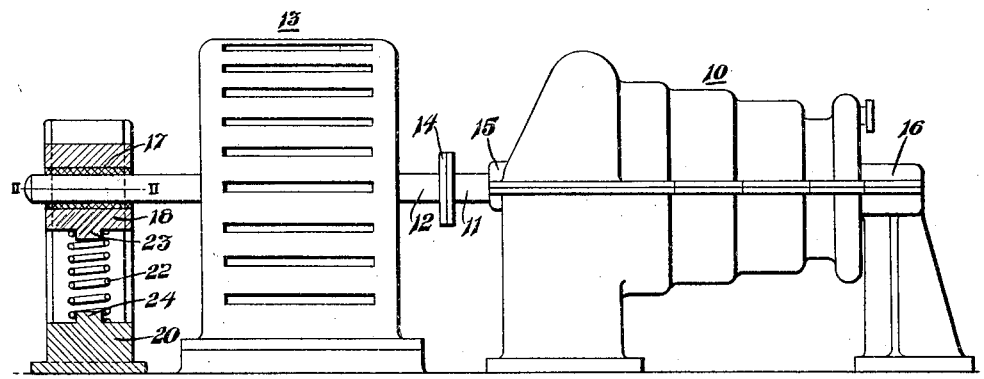
Figure 2:
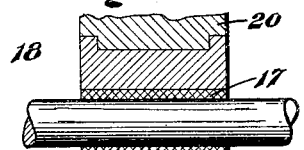
Figure 3:
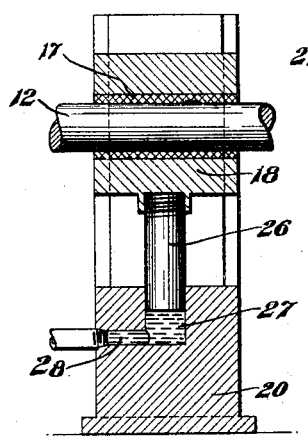
Figure 4:
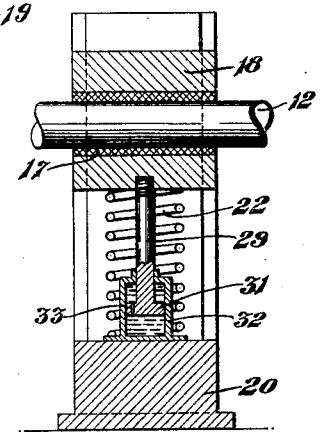

In the accompanying drawing, Fig. 1 is a side view, partially in section and partially in elevation, of an organization embodying my invention; Fig. 2 is a detailed sectional view on the line II—II of Fig. 1; and Figs. 3 and 4 are detailed sectional views showing modifications of my device.

The shafts of alined and directly connected machines, such, for example, as turbine-driven electrical generators, are usually supported in four, rigidly mounted bearings, two for each machine. As the expansion of the two machines under the temperature rise caused by their operation is frequently unequal, these bearings are often forced out of alinement; this being especially true in a turbo-generator, in which case the mis-alinement is accentuated by reason of the greater expansion of the high pressure end than the low pressure end of the turbine. To compensate for this mis-alinement a flexible coupling is usually provided between the shafts of the two machines.

Such an arrangement not only adds considerably to the overall length of the apparatus, but the use of two intermediate bearings and the flexible coupling considerably increases the cost thereof.

I have provided, by my invention, an apparatus in which the combined shafts of the two machines are supported in three bearings, one of which is floating and the other two of which are fixed, so that one of the usually employed intermediate shaft bearings, and the flexible coupling are eliminated, and at the same time compensation is provided for any mis-alinement of the shafts. Still other structural features of my invention will be apparent from the subjoined description.

Referring to Fig. 1 of the drawing, I show a steam turbine 10, provided with a shaft 11, driving the shaft 12 of an electric generator 13. The shafts 11 and 12 are rigidly coupled in axial alinement by any well-known means, such as by the flanged coupling 14. The shaft 11 is supported at the ends of the turbine 10 by the bearings 16 and 17, of any suitable type. The bearing 15 also acts as a support for the coupled end of the generator shaft 12, the coupling 14 connecting the shafts 11 and 12 with sufficient rigidity to permit of this arrangement.

The outer end of the shaft 12 is supported in a specially mounted floating bearing 17. As shown, this bearing 17 is mounted in a bearing block 18, adapted to slide vertically in a pair of guides 19, carried by a bifurcated pedestal 20. The bearing block 18 is provided with suitable grooves 21 to cooperate with the guides 19. The weight of the bearing block 18, and the parts supported thereby, is carried by a helical compression spring 22, adapted to bear between an abutment 23 on the lower face of the block 18, and an abutment 24 on the lower portion of the pedestal 20, located between the halves of the divided portion thereof.

It is apparent that the resilient support for the free end of the shaft 12, which is provided by the spring mounting of the bearing 17, will permit slight movement of this bearing, thus compensating for any mis-alinement between it and the bearings 15 and 16. In this manner, the load on the free end of the shaft 12 is sustained without the imposition of any undue stresses on any of the bearings, while the overall length of the machine is considerably reduced, and one guide bearing and the expensive coupling are eliminated.

In the modification of my device illustrated in Fig. 3 I have shown the bearing 17 provided with a downwardly projecting plunger member 26, adapted to cooperate in fluid-tight relation with a cylindrical chamber 27, formed in the lower portion of the pedestal 20. A duct 28, communicating with the lower end of the chamber 27, is connected to any suitable source of fluid under pressure, so that the resulting pressure in the chamber 27 forces the flange 26 upward to sustain the weight of the bearing 17, in a manner readily understood. Oil from the turbine lubricating system provides a convenient fluid for this purpose, but it is to be understood that any suitable fluid, such as water, may be employed.

In Fig. 4 I have illustrated a modification of the apparatus shown in Fig. 1 in which the bearing block 18 is provided with a depending rod 29 carrying at its lower end a piston 31, operating in a dash pot 32. The dash pot 32 is filled with any suitable fluid, such as oil, and the piston 31 is provided with a duct 33 of relatively small cross section, so that motion of the piston 31 within the dash pot 32 is retarded. In this manner, vibration of the supporting spring 22 is dampened, as will be readily understood.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In an organization comprising a pair of shafts, fixed bearings for one of the shafts, a rigid coupling connecting the shafts end to end in power transmitting relation, a bearing resiliently supporting the other end of the second shaft, and means restricting motion of the movable bearing to a vertical plane, whereby the alinement of said bearings is maintained.

2. In an apparatus of the character described, the combination of a pair of aligned shafts, fixed bearings for one of said shafts, a rigid coupling for connecting in power transmitting relation the adjacent ends of the two shafts, a yieldably mounted bearing for the end of the other of said shafts opposite to the rigid coupling, and means for restricting the motion of the yieldable mounted bearing to a plane transverse to the longitudinal axis of the shaft.

In testimony whereof I have hereunto subscribed my name this 7th day of February, 1922.

HERBERT T. HERR.